United States Patent [19]

Salazar et al.

[11] 4,155,873

[45] May 22, 1979

[54] DISPERSING OF DRY ORGANIC SOLIDS IN A HIGH VISCOSITY EMULSION OF ORGANIC LIQUID IN WATER, AND PRODUCT

[75] Inventors: Nino M. Salazar, Orsay; Jacques H. Collonge, Bures sur Yvette, both of France

[73] Assignee: The Goodyear Tire & Rubber Company, Akron, Ohio

[21] Appl. No.: 816,049

[22] Filed: Jul. 15, 1977

[51] Int. Cl.² .................... B01J 13/00; C08L 91/08; C09K 15/08
[52] U.S. Cl. .................... 252/312; 252/188; 252/314; 260/28.5 R; 260/29.2 R; 260/29.6 PM; 260/34.2
[58] Field of Search .................. 260/29.6 PM, 28.5 R; 252/314, 312

[56] References Cited

U.S. PATENT DOCUMENTS

| | | | |
|---|---|---|---|
| 1,440,355 | 12/1922 | Morrell | 106/277 |
| 1,556,005 | 12/1925 | Morrell | 252/314 |
| 1,719,948 | 7/1929 | Teague | 260/29.6 PM |
| 1,735,547 | 11/1929 | Reel et al. | 252/314 |
| 2,684,949 | 7/1954 | McMillan et al. | 252/314 |
| 2,722,528 | 11/1955 | Johnson | 106/198 |
| 2,740,723 | 4/1956 | Voris | 106/198 |
| 2,993,800 | 7/1961 | Pickell | 252/314 |

*Primary Examiner*—Murray Tillman
*Assistant Examiner*—A. H. Koeckert
*Attorney, Agent, or Firm*—D. B. Little; J. Y. Clowney

[57] ABSTRACT

An aqueous emulsion of a water insoluble liquid and a water insoluble solid is prepared by first forming a high viscosity emulsion of the liquid in water and then slowly adding the solid to the emulsion with low speed agitation, thereby forming a concentrated co-emulsion which can be diluted to the desired activity.

3 Claims, No Drawings

DISPERSING OF DRY ORGANIC SOLIDS IN A HIGH VISCOSITY EMULSION OF ORGANIC LIQUID IN WATER, AND PRODUCT

This invention relates to a process of preparing an emulsion. More particularly it relates to a process of preparing a co-emulsion where the active components consist intitially of liquid and solid substances.

Various areas, such as those of latex compounding, cosmetics, pesticides, etc., require the use of combinations of materials in suspension or emulsion form. When one component is a liquid and the other is a solid which is soluble in the liquid, the solid can be dissolved in the liquid and the resulting solution emulsified. Such a technique can be undesirable since it requires an extra step prior to emulsification and can require the use of extra equipment.

It is desirable that a process be found for preparing an emulsion of a liquid plus a solid which is not time consuming, and is inexpensive, practical, simple and capable of providing a stable emulsion with a small particle size and narrow particle size distribution.

It is an object of the present invention to provide a process for preparing an emulsion of a liquid plus a solid which is not time consuming, is inexpensive, practical, relatively simple, and capable of providing a stable emulsion with a small particle size and narrow particle size distribution. Other objects will become apparent as the description proceeds.

In accordance with the practice of the present invention, stable homogeneous co-emulsions having a small particle size and narrow particle size distribution can be prepared by adding the solid to a viscous aqueous emulsion of the liquid. The emulsified liquid itself must possess a small particle size and narrow particle size distribution and have a high level of the water insoluble liquid present, preferably as high as possible without causing phase inversion. The high level of liquid results in a high viscosity. Since such an emulsion is sensitive to inversion, care should be taken that the agitation is not so severe during the addition of the solid as to cause inversion.

The liquid emulsion can be obtained either by adding the liquid to water containing a surfactant, or water, containing surfactant, to the liquid using low speed agitation. In either case, the viscosity of the emulsion increases as the addition is being made. Because of the high viscosity, shear can be achieved between the particles in the viscous emulsion using low speed agitation. Under low speed agitation, the particles in the viscous emulsion travel at different rates of speed around the agitator. The difference in the rates of the particles results in a shearing action between the particles themselves, resulting in small particle size and narrow particle size distribution. High speed agitation is to be avoided since it may cause inversion when the internal phase ratio is high. Although high speed agitation can result in small particle size it normally requires time and expensive equipment and can result in a broader particle size distribution.

The amount of solid is limited only by its solubility in the organic liquid which can be increased naturally by heating the emulsion. It is imperative that the water level be maintained and the water not permitted to evaporate without being replaced, otherwise inversion can occur. Either the water can be replaced or efforts made to prevent evaporation, e.g., by operating in a closed container using a condensor, etc.

Once the solid addition is complete and the solid solubilised by the liquid, water can be added to provide an emulsion of the desired activity.

Any conventional emulsifier can be used in conventional amounts, for example, sodium alkyl sulfate or potassium oleate. In order to obtain the highest internal phase ratio very efficient surfactants such as sulfates and sulfonates are desirable, for example, sodium alkyl sulfates, paraffin sulfonates and sodium alkyl ether sulfates.

Any organic or polymeric liquid insoluble in water and any organic or polymeric solid insoluble in water but soluble in the particular organic or polymeric liquid can be used. Preferably the solid is in finely ground form to facilitate ease of dissolving the solid in the organic or polymeric liquid.

The liquid phase may be comprised of more than one liquid and the solid phase may be comprised of more than one solid.

The following are intended to be guidelines and not limitations. The ratio of water to organic or polymeric liquid to form the emulsion normally ranges from about 3 to 26 parts by weight of water per 70 to 95 parts by weight of water insoluble liquid. Two to four parts of emulsifier are normally used. The weight ratio of water insoluble liquid to the solid will depend upon the physical nature of the system (ie: viscosity, solubility). The terminology "highly active" emulsion as used herein is intended to refer to those emulsions which contain very high levels of the active ingredients. Although the ultimate active ingredients content (water insoluble liquid plus solid) can vary after the final amount of water is added it normally ranges from about 40 to 70 percent by weight, particularly where the liquid and solid are solvents, plasticisers, antioxidants and polymers. A typical high activity emulsion before dilution will contain 77 to 88 percent of the organic or polymeric liquid plus the organic or polymeric solid, 2 to 6 percent emulsifier and 10 to 21 percent water.

A liquid/solid combination which is particularly benefited by the practice of the present invention is a liquid butylated, octylated phenolic reaction product whose main constituent is 2,4-dioctyl, 6-butyl phenol, and a solid product prepared by butylating the reaction product of p-cresol and dicyclopentadiene.

The following examples illustrate but are not intended to limit the practice of the present invention.

EXAMPLE 1

240 grams of Wingstay T[(1)] (liquid), a butylated, octylated phenolic reaction product, where heated to 75° C. in a reactor. The liquid was agitated with a simple lab stirrer at 1500 rpm. 25.3 grams of a blend of the sodium salt of alkyl sulfonate and sodium alkyl ether sulfate (a 37% solution in water) blended with 16 grams of water was poured all at once into the reactor while the Wingstay T was being agitated. The emulsion was stirred for 10 minutes. 40 grams of Wingstay [(1)]L (powder), butylated reaction product of p-cresol and dicyclopentadiene, were slowly (during ½ hour) poured into the reactor. The temperature of 75° C. and agitation were maintained for 3 hours. An 87.1% active oil in water emulsion was obtained. The average particle size was below 1 micron. This emulsion was diluted to the desired viscosity and activity by the addition of cold water with stirring. The stability of a 1200-1500 centipoises emulsion is greater than one month.

(1) Wingstay is the registered trademark of THE GOODYEAR TIRE & RUBBER COMPANY.

EXAMPLE 2

A cold solution of 9.36 grams of sodium lauryl sulfate in 32 grams of water was added to 240 grams of di-tridecylthiodipropionate (liquid) at room temperature under the same agitation conditions as described in Example 1. This emulsion was stirred during the necessary time to heat it to 60° C. 40 grams of Wingstay L were slowly added (during ½ hour) to the emulsion. Twice 5 gram portions of water were added to maintain the viscosity in a workable range. An 84.5% active oil in water emulsion was obtained with a particle size below 2 micron. This very viscous emulsion can be diluted to the required viscosity and concentration.

The term "low speed agitation" as used herein refers to the degree of agitation necessary to provide the small particle size (e.g., where the majority of particles are less than 1.5 microns) and narrow particle size distribution, i.e., not so great as to destroy the shearing action between the particles themselves and/or not so great to cause inversion.

EXAMPLE 3

158 Kg of a 28% solution of sodium lauryl sulphate in water were added to 39.5 Kg water in a 6000 liter jacketed reactor and heated to 75° C. under agitation (conventional axial flow impellers at 128 rpm) heated to 75° C. under agitation.

To this, were added 866 Kg of Wingstay T (preheated to 55° C.). All the time maintaining the agitation. To the emulsion of Wingstay T formed, were added 433 Kg of Wingstay L during 2 hours. The agitation was then continued for a further 10 hours with the temperature being maintained at 75°-85° C.

1496.5 Kg of a "high active content" (86.8%) emulsion was obtained with a narrow particle size distribution and average diameter of approximately 1 micron.

The emulsion was diluted with 500 Kg water to obtain a 65% active emulsion having low viscosity and being stable for more than 3 months without agitation.

EXAMPLE 4

72.5 g of White Spirit (containing 17% aromatic hydrocarbons) and 72.5 g of ALAIFLEX(2) 50 A6 (Chlorinated paraffin) were added separately but at the same time into a cold (room temperature) solution of 27.5 g of sodium lauryl sulphate (28% solution in water—ie EMPICOL(3) LX 28) in 5 g of water with the agitation as described in Example 1.

The emulsion so produced was stirred during ½ hour prior to adding slowly (during 3 hours) 72.5 g of a powdered vinyl/Acrylic copolymer -Pliolite (4) Resin VTAC-L. Agitation for one further hour was needed for complete solubilization.

The emulsion so formed consisted of 58% polymer; 29% solvent; 9.9% water and 3.1% emulsifier.

(2) Alaiflex is the registered trademark of Rhone-Poulenc Industries.

(3) Empicol is the registered trademark owned by Albright & Wilson.

(4) Pliolite is the registered trademark of THE GOODYEAR TIRE & RUBBER COMPANY.

While certain representative embodiments and details have been shown for the purpose of illustrating the invention it will be apparent to those skilled in this art that various changes and modifications may be made therein without departing from the spirit or scope of the invention.

What we claim is:

1. A process of forming an emulsion system comprised of water insoluble organic liquid, water insoluble organic solid soluble in the organic liquid and suitable emulsifier comprising
    (A) forming an emulsion of about 70-95 parts by weight of the water insoluble organic liquid in about 3-26 parts by weight water, with the organic liquid as the internal phase, said internal phase having a particle size of less than or equal to about 2 microns and a narrow particle size distribution, by adding the water insoluble organic liquid to a mixture of water and the emulsifier using low speed agitation; and
    (B) adding a dry water insoluble organic solid in ground form which is soluble in the organic liquid, to the aqueous emulsion (A) with low speed agitation.

2. The process of claim 1 wherein the water insoluble organic liquid is a butylated, octylated phenolic reaction product; the organic solid is a butylated reaction product of p-cresol and dicyclopentadiene; the emulsifier is selected from the group consisting of a blend of the sodium salt of alkyl sulfonate and sodium alkyl ether sulfate, and sodium lauryl sulfate; step (A) is performed at about 55°-75° C.; and step (B) is performed as follows; (a) the organic solid is added over a time span of about ½ to 2 hours, (b) agitation is continued for about 3-10 hours after said addition, and (c) temperature is maintained at about 75°-85° C.

3. The emulsion made by the process recited in claim 2 wherein the weight ratio of the liquid butylated, octylated phenolic reaction product to the solid, butylated reaction product of p-cresol and dicyclopentadiene is about 2:1; and wherein said emulsion is further diluted with water to obtain a final solids content of about 65 weight percent.

* * * * *